Nov. 19, 1957   A. G. PURDUE   2,813,961
METHOD OF AND APPARATUS FOR STORAGE HEATING OF MATERIALS
Filed Aug. 23, 1954   3 Sheets-Sheet 3
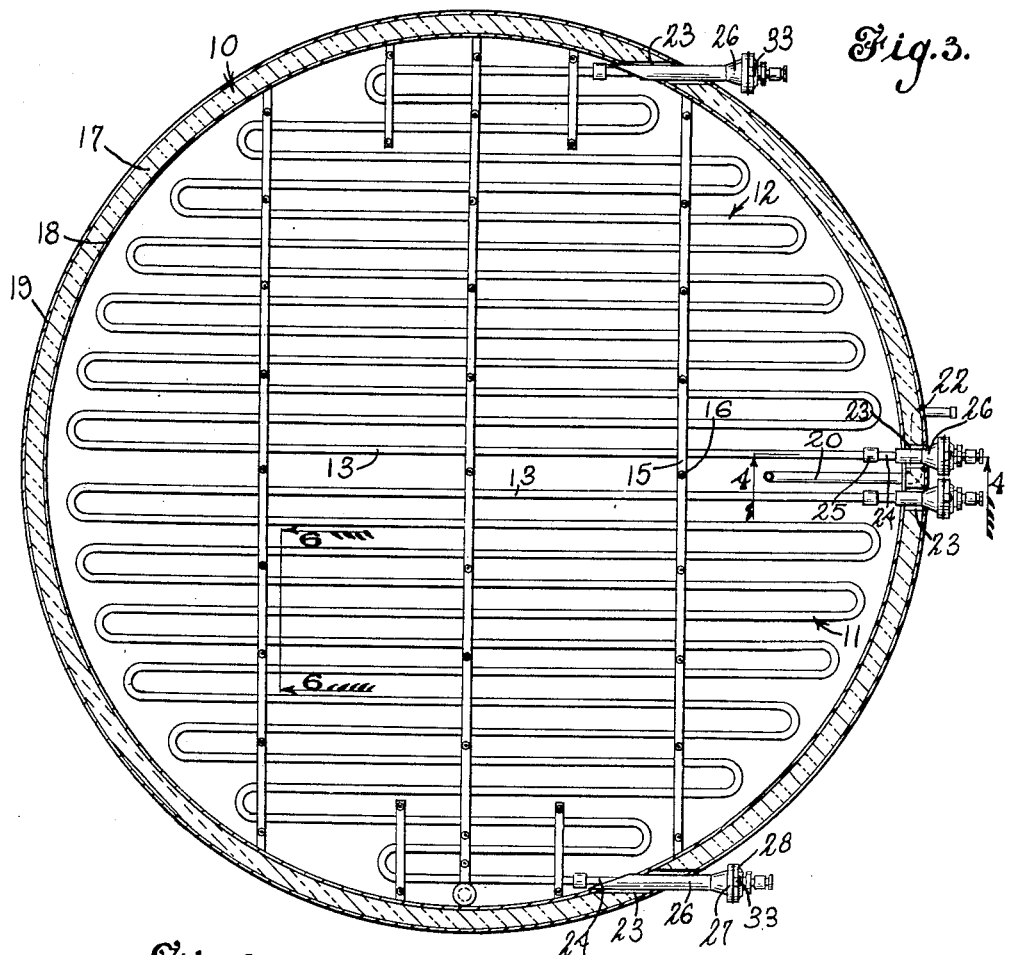
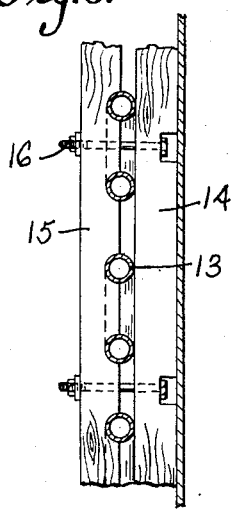
INVENTOR
Albert G. Purdue
BY
Rockwell & Leichter
ATTORNEYS 2,813,961
Patented Nov. 19, 1957

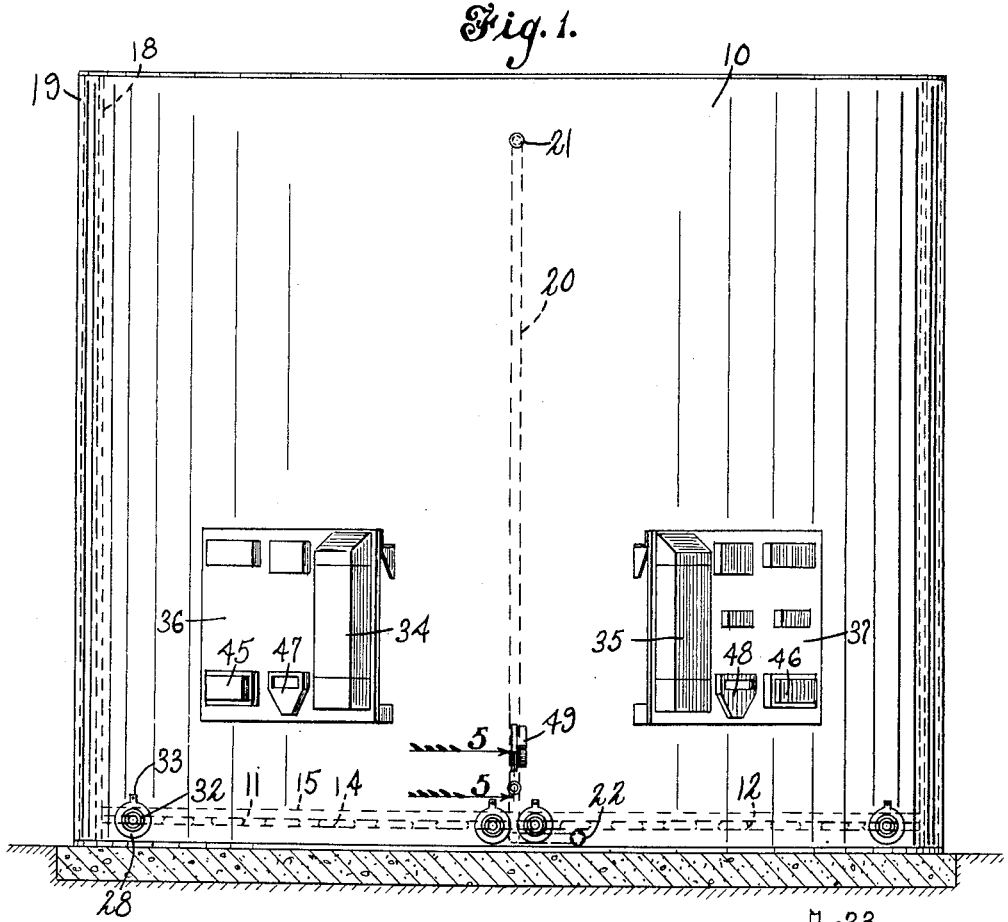
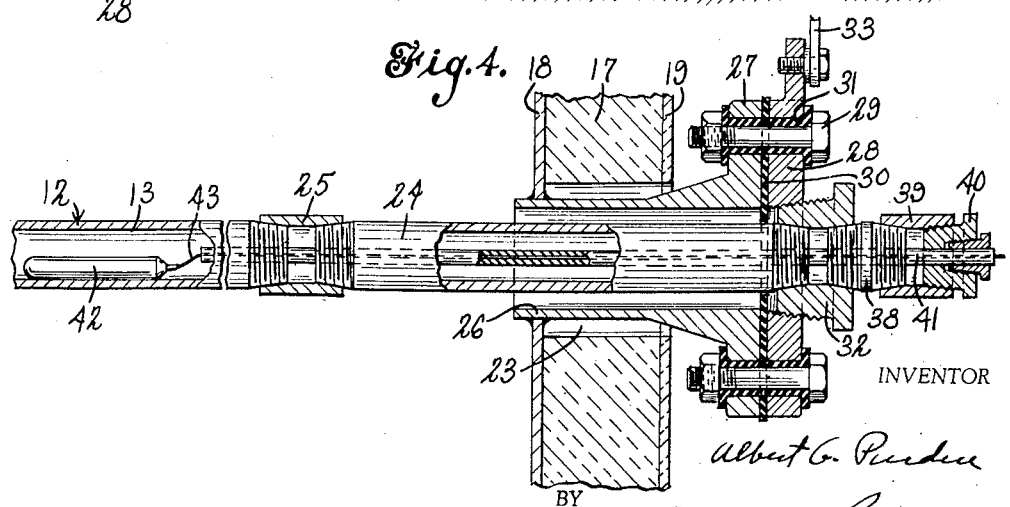

2,813,961

METHOD OF AND APPARATUS FOR STORAGE HEATING OF MATERIALS

Albert G. Purdue, Woodbridge, Conn., assignor to Fluid Systems, Incorporated, Hamden, Conn., a corporation of Connecticut Application August 23, 1954, Serial No. 451,597

4 Claims. (Cl. 219—19)

This invention relates to the storage heating of materials and more particularly to the heating in storage of temperature-sensitive materials or materials which will be deleteriously affected by temperature of a certain degree.

There are a number of materials which are either solid or viscous at ordinary temperatures and which it is necessary to heat in order to reduce to a liquid or more fluid state in order that they may be transported by pumping or the like from one place to another. In many manufacturing operations such materials are employed or applied at a point which is some distance from the point of storage of the material, and it is necessary to heat the material in order that it be easily transported over this distance. In such a case it is desirable to apply heat to the material in storage and in some instances where the material is of solid form at ordinary temperatures this is a necessity if it is to be removed from storage as a liquid.

Some of these substances are temperature-sensitive materials in that they cannot be heated excessively without deleterious effects or in some cases without disastrous results. For example, many of these materials will carbonize, caramelize or oxidize or otherwise change their chemical or molecular structure when they come in contact with a heat density which is not sympathetic with the characteristics of the material.

Trouble sometimes occurs in this respect for, if the melting of the material is effected by a heating element placed within the body of material, it may be a relatively simple matter to control the temperature of the melted mass so that it will not get beyond the desired degree of temperature, but those parts of the mass in contact with the heat element will become overheated as it is necessary to have the heat element at a higher heat density than the temperature of the entire mass in order to bring the latter to a liquid state.

Usually when such heating is effected, it is controlled by the temperature of the liquid in that if a thermostatic control is employed, the sensing element of the thermostat is placed within the melted liquid and the applied heat will be controlled by this temperature. While this will control the temperature of the mass of material in a fairly satisfactory manner, it will not control the temperature of that portion of the mass in contact with the heat element as such portion of the mass will be the same temperature as the heat element itself and the heat density of the latter might be such as to effect deleterious results.

This applies to paraffin and to other substances as well. For example, fuel oil will tend to carbonize if it is in contact with a heat element having a heat density above a certain degree while such substances as molasses and corn syrup, for example, will caramelize under the same circumstances or when coming in contact with a heat density which is unsympathetic to their characteristics.

When it is attempted to effect such heating by the use of steam passed through a coil immersed in the material to be heated, the temperature of the coil would be substantially the same as that of steam, and this could not be controlled by a control subject to the temperature of the liquid material itself, and this will be true regardless of the exposed area of the heating coil, for while increasing the area might lower the heat density required to liquefy the material, nevertheless the temperature of the steam could not be reduced below the boiling point. For this reason hot water is employed in some instances, but in such instances the temperature is not subject to close control as is the case when electrical resistance heating is employed as in the present apparatus.

It is possible, however, to provide an electrical resistance heat element or coil disposed within the storage tank in which the material is contained and control the heat density of this coil by controlling the amount of current applied thereto, the coil being heated by its resistance to the applied current. Moreover, a given area of the coil to which the material is exposed can be developed by the size and length of the coil so that the heat density of the coil need not rise above a maximum, the length or area of the coil being sufficient to maintain the material in fluid state when the heat density is below the point at which injury to the material will be effected. The control of the current applied to the coil may then be effected from the temperature of the coil itself by placement of the sensing device of the controlling thermostat in such a position that it will be subject to the temperature of the coil and not affected by the temperature of the material in storage.

Moreover, with such a method of heating, uniformity of temperature of the coil may be secured by providing coil of uniform cross section so that the sensing element need only measure the temperature at one point and, if the current flowing through the coil is uniform, and it will be uniform providing the cross sectional area of the coil is uniform, then the temperature of the coil will be the same throughout its length.

In addition, in the described arrangement, a flexibility of control is obtained at any heat density below that for which the installation is designed. For example, by adjustment of the controlling thermostat, the temperature can be raised if desired for the melting out of any material which might remain within the tank but at the same time during normal operations the coil may be maintained at any heat density desired for operation below the designed upper limit.

One object of the present invention is to provide a new and improved method for heating materials in storage.

Another object of the invention is to provide a new and improved apparatus for the heating in storage of materials designed to be transported from storage in liquid condition.

Still another object of the invention is to provide a novel method and apparatus such that materials which are either in solid form or viscous at ordinary temperatures may be safely heated in storage so as to be easily removed therefrom in liquid condition without danger of the material being deleteriously affected by being brought into contact with a heat density above a given amount.

Still another object of the invention is to provide a method of and apparatus for heating materials in storage as described above wherein the heat density of the heating element is controlled by or from the temperature of the heat element itself rather than from the temperature of the material being heated.

Still another object of the invention is to provide a method of and apparatus for the storage heating of liquids of the class described wherein the heat density of the heat element will be thermostatically controlled, and the sensing element of the thermostat is placed in contact with the heat element itself and so arranged that it will be unaffected by the temperature of the material being heated.

To these and other ends the invention consists in the novel features and combinations of parts to be hereinafter described and claimed.

In the accompanying drawings:

Fig. 1 is a front elevational view of a storage heating tank embodying my improvements;

Fig. 3 is a sectional view on line 3—3 of Fig. 2;

Fig. 4 is a sectional view on line 4—4 of Fig. 3 through the end of one of the heating coils showing the sensing element of the thermostat;

Fig. 6 is a sectional view on line 6—6 of Fig. 3.

Figure 2:
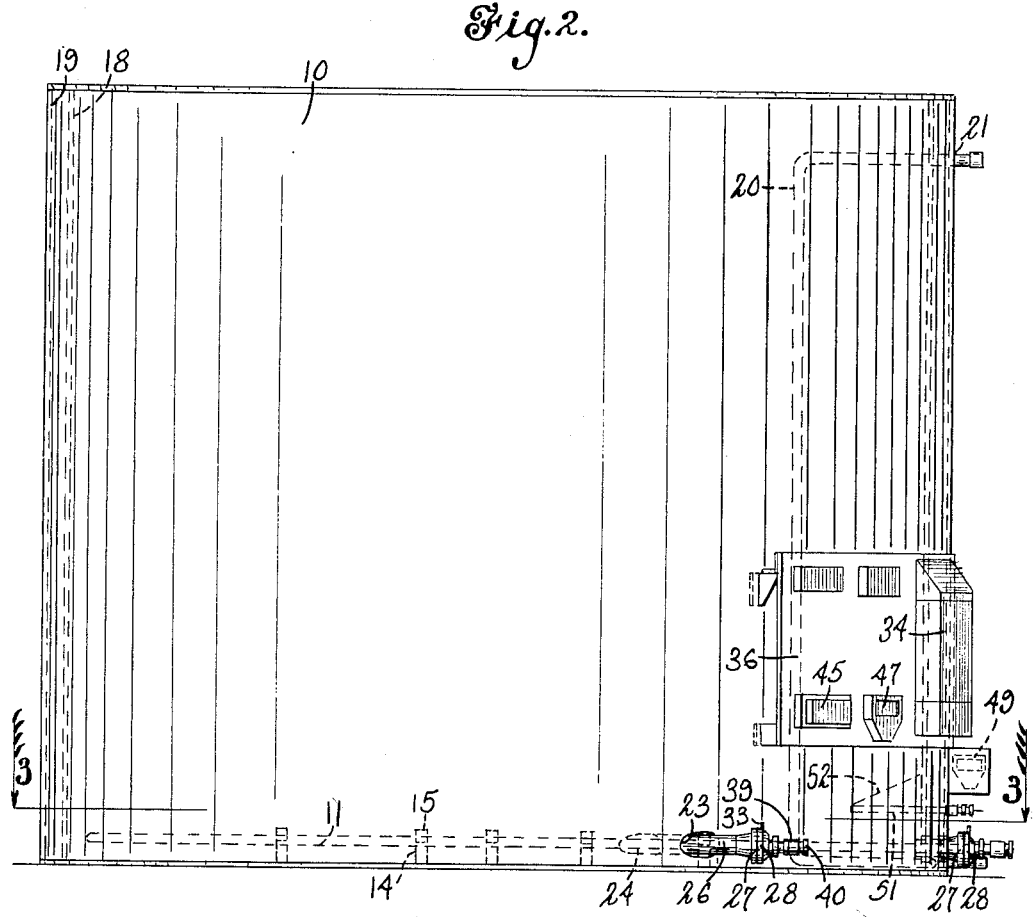
Fig. 2 is a side elevational view thereof.

To illustrate a preferred embodiment of my invention, I have illustrated an apparatus for the storage heating of materials comprising a tank 10 within which the material is to be contained.

Disposed within the tank and adjacent the bottom thereof are a plurality of heating coils 11 and 12, two of such coils being shown but it will be understood that the number may be more or less as desired. Each of these coils comprises an elongated hollow tubular member 13 coiled or turned upon itself as shown in Fig. 3 and in the cross sectional view of Fig. 6. The turns or coil of the hollow member 13 may be supported upon rails 14 resting upon the bottom of the tank and held in place by upper cooperating rails 15 secured to the lower rails by bolts 16. These rails may be of any suitable material and may be of wood, for example, if the tank is employed for paraffin.

Figure 5:
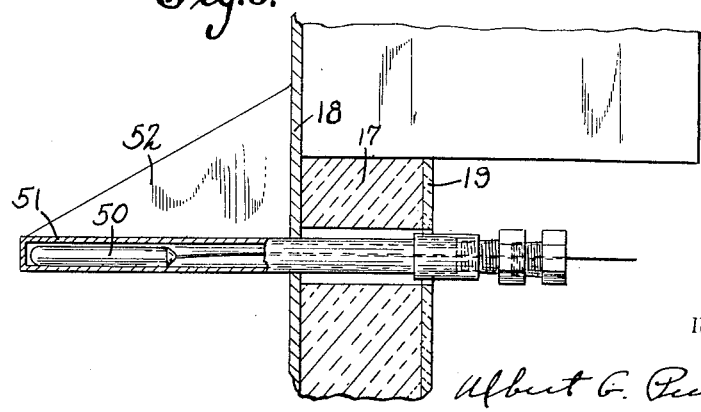
Fig. 5 is a sectional view on line 5—5 of Fig. 1.

As shown in Fig. 5, the wall of the tank will preferably be covered with an insulated material shown at 17 which will lie between the wall 18 and an outer insulating cover 19. Also if desired, there may be provided a pipe or tubular member 20 extending vertically of the tank within the same, the ends of this member being brought outwardly through the tank walls at 21 and 22 so that steam may be introduced into the pipe for melting out operations if this is desired. This is an auxiliary structure which is no part of the present invention and may be used or dispensed with as desired.

As shown more especially in Figs. 3 and 4, the two ends of the coils 11 and 12 are brought outwardly through openings in the tank wall so that an electric current may be applied to the hollow members 13 of which the coils are composed. For this purpose the front portion of the tank is provided with openings 23, four in number, one for each of the coil ends, and a short length of pipe 24 is, as shown in Fig. 4, secured to each of the free ends of the members 13 by the coupling 25. Each of the members 24 is brought outwardly through a collar or tubular adapter 26 secured to the inner wall 18 of the tank. The adapter 26 is provided with a flange 27 to which is secured a cap 28 by the bolts 29. The cap and bolts are insulated from the flange 27 by an insulating washer 30 and insulating tubular members 31 surrounding the bolts. Each of the members 24 is threadedly secured to a bushing 32 which in turn is threaded into the cap 28 so that the bushing as well as the member 24 will be insulated from the wall of the tank.

Connected to each of the caps 28 (it will be seen that there are four of such caps provided, one at each end of each of the coils 11 and 12) is a current conductor 33 through which current will be applied to the pipe 24 and thence to the tubular heating element 13 to apply a current to the latter and through its resistance heat the latter to the desired temperature. Current will be supplied to the conductors 33 through suitable transformers or transforming energizers 34 and 35 mounted upon panel boards 36 and 37 supported upon the side wall of the tank. It will be understood that the transforming energizer 34 supplies the current to the coil 11 while the coil 12 is supplied by the transforming energizer 35.

Threaded in each of the bushing 32 is an insulating nipple 38 to which is secured a coupling 39. Threaded in this coupling is a bushing 40 which carries a tubular element 41 extending into the tube 13. A thermostat-sensing bulb 42 is mounted within the tubular heating element 13 in contact with the wall thereof, and the usual capillary tube 43 leads from this element through the bushing 40 to a controlling thermostat mounted on one of the panels 36 or 37. The tubes 43 of the two outer coil ends, as shown in Fig. 1, lead to the thermostats 45 and 46 respectively while the tubes 43 from the inner coil ends lead to indicating thermostats 47 and 48. Each of these thermostats is arranged, in the usual manner, to control the adjacent transforming energizer 34 or 35 as the case may be so that the temperature of the members 13 of the coil never rises above that for which these thermostats are set.

In addition to controlling the temperature of the coils it may be desirable also to control the temperature of the melted material. For this purpose a controlling thermostat 49 (Fig. 1) is provided at the front of the tank, this thermostat being adapted to control the current to both coils. This thermostat is actuated by a sensing bulb 50 (Fig. 5) disposed within and contacting the wall of a tubular member 51 secured to the inner wall 18 of the tank by the bracket 52 and immersed within the material. A tube from this sensing element leads to the thermostat 49 in the usual manner.

By the use of a tubular heating element the area of the element exposed to the material will be greater in respect to the cross-sectional area of the heating element, and the use of such an element also permits the sensing device of the thermostat to be placed therein and thus shielded from contact with the stored material and from the influence of the temperature of the body of stored material as the sensing element will reflect the temperature of the heating element itself. By controlling the current delivered to the heating element by the temperature of the latter, this temperature can be regulated or adjusted within very close limits, thus obtaining the desired maximum heat to maintain the stored material in liquid form and at the same time preventing the heating density of the heating element from reaching a point which would harmfully affect the stored material.

It will be apparent that the heating coils will be insulated from the tank and are located close to the bottom of the tank. The tank itself may rest upon a bed of insulating material as well as having its walls properly insulated to prevent loss of heat.

While I have shown and described a preferred embodiment of my invention and a preferred method of carrying out my improved process, it is to be understood that the invention is not to be limited to all the details shown, but is capable of modification and variation within the spirit of the invention and within the scope of the appended claims.

What I claim is:

1. The method of storage heating of material which comprises immersing within the material to be heated an electrically conductive coil comprising a length of hollow pipe, applying to said coil an electric current to heat the same by its resistance to the passage of the current, and controlling the applied current by a temperature-responsive element disposed within, and in contact with the inner surface of, the pipe.

2. The method of storage heating of material which comprises immersing within the material to be heated a hollow electrically conductive coil, applying to said coil an electric current to effect resistance heating thereof, and limiting the maximum temperature to which the coil is raised independently of the temperature of the stored material by controlling the applied current according to the temperature of the coil by means of a temperature-sensing element disposed within the coil.

3. Apparatus for the storage heating of material comprising a container for the material, a heating element comprising a coiled hollow member of electrically conductive material within the container and immersed within the material to be heated, means for passing an electric current through said element to heat the same by its resistance, and means to control said current by the temperature of the coil, said means having a temperature-sensitive element within, and in contact with, the coil but shielded from contact with the stored material.

4. Apparatus for the storage heating of material comprising a container for the material, a heating element of electrically conductive material within the container and adapted to be immersed within the material to be heated, means for passing an electric current through said element to heat the same by its resistance, said heat element comprising a hollow elongated member, and temperature-sensitive means within said member to control the current applied to said member, said last-named means being in contact with the inner surface of the member.

References Cited in the file of this patent

UNITED STATES PATENTS

| | | |
|---|---|---|
| 1,673,395 | Clark | June 12, 1928 |
| 1,684,942 | Carleton | Sept. 18, 1928 |
| 1,912,921 | Spencer | June 6, 1933 |
| 1,923,584 | Ray | Aug. 22, 1933 |
| 2,332,227 | Jackson | Oct. 19, 1943 |
| 2,396,183 | Lightfoot | Mar. 5, 1946 |
| 2,396,238 | Beck | Mar. 12, 1946 |
| 2,541,321 | Badger | Feb. 13, 1951 |
| 2,563,021 | Gendron | Aug. 7, 1951 |
| 2,575,113 | Lennox | Nov. 13, 1951 |
| 2,730,607 | Tillison | Jan. 10, 1956 |